(12) United States Patent
Shirakata et al.

(10) Patent No.: US 9,531,318 B2
(45) Date of Patent: Dec. 27, 2016

(54) ROTATING ELECTRICAL MACHINE (75) Inventors: Yuji Shirakata, Chiyoda-ku (JP); Dai Nakajima, Chiyoda-ku (JP); Masahiko Fujita, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 113 days.

(21) Appl. No.: 13/879,722

(22) PCT Filed: Dec. 10, 2010

(86) PCT No.: PCT/JP2010/072262
§ 371 (c)(1),
(2), (4) Date: Apr. 16, 2013

(87) PCT Pub. No.: WO2012/077233
PCT Pub. Date: Jun. 14, 2012

(65) Prior Publication Data
US 2013/0221890 A1    Aug. 29, 2013

(51) Int. Cl.
 *H02P 1/04* (2006.01)
 *H02P 29/00* (2016.01)
 *H02P 29/02* (2016.01)
(52) U.S. Cl.
 CPC ........... *H02P 29/0088* (2013.01); *H02P 29/02* (2013.01); *H02P 29/032* (2016.02)
(58) Field of Classification Search
 CPC ......... H02P 27/08; H02P 29/028; H02P 29/02; H02P 29/0088; H02P 3/18; H02P 9/30
 USPC ............... 318/471, 430, 433, 434, 721, 722; 180/65.1, 65.29, 65.31, 65.8
 See application file for complete search history.

(56) References Cited

U.S. PATENT DOCUMENTS

| | | | | |
|---|---|---|---|---|
| 5,227,703 A | * | 7/1993 | Boothe | ...................... B60L 3/00 318/139 |
| 5,726,559 A | * | 3/1998 | Taniguchi | ............... H02J 7/242 322/20 |
| 6,359,405 B1 | * | 3/2002 | Tsurumi | ........................ 318/434 |

(Continued)

FOREIGN PATENT DOCUMENTS

| | | |
|---|---|---|
| JP | 3-27718 A | 2/1991 |
| JP | 9-215388 A | 8/1997 |

(Continued)

OTHER PUBLICATIONS

International Search Report for PCT/JP2010/072262 dated Mar. 1, 2011.

*Primary Examiner* — Bentsu Ro
*Assistant Examiner* — Thai Dinh
(74) *Attorney, Agent, or Firm* — Sughrue Mion, PLLC; Richard C. Turner (57) ABSTRACT

Provided is a rotating electrical machine capable of downsizing. The rotating electrical machine includes: a stator (2) including an armature winding (9); a rotor (3) provided inside the stator (2) in a rotatable manner; a power circuit unit (18) including a power circuit semiconductor switching element, for supplying a current to the armature winding (9); and a control board (6) in which an energization-allowed time corresponding to revolution speed of the rotor (3) is set, for controlling supply of the current by the power circuit unit (18), in which the control board (6) stops the supply of the current by the power circuit unit (18) when an integrated time of energization times to the armature winding (9) is longer than the energization-allowed time.

7 Claims, 5 Drawing Sheets

(56) References Cited

U.S. PATENT DOCUMENTS

| | | | | |
|---|---|---|---|---|
| 6,422,331 | B1* | 7/2002 | Ochiai | B60K 6/48 |
| | | | | 180/65.25 |
| 6,611,115 | B2* | 8/2003 | Wakashiro | B60K 6/485 |
| | | | | 180/65.1 |
| 7,075,762 | B2* | 7/2006 | Iimura | H02H 7/122 |
| | | | | 361/18 |
| 7,253,590 | B2* | 8/2007 | Suzuki | H02P 9/48 |
| | | | | 322/20 |
| 7,541,756 | B1* | 6/2009 | Parent | H02P 23/0077 |
| | | | | 318/139 |
| 8,917,039 | B2* | 12/2014 | Yugo | H02P 7/00 |
| | | | | 318/139 |

FOREIGN PATENT DOCUMENTS

| | | |
|---|---|---|
| JP | 11-355959 A | 12/1999 |
| JP | 4082327 B2 | 4/2008 |
| JP | 4172148 B2 | 10/2008 |
| JP | 2008-543266 A | 11/2008 |
| WO | 2007/003824 A2 | 1/2007 |

\* cited by examiner

MAP FOR EACH RPM:TEMPERATURE RISE VALUE ΔT=CONSTANT
(ENERGIZATION-ALLOWED TIME: t – B-TERMINAL VOLTAGE: Vb)

FIG. 5

ROTATING ELECTRICAL MACHINE

CROSS REFERENCE TO RELATED APPLICATIONS

This application is a National Stage of International Application No. PCT/JP2010/072262 filed Dec. 10, 2010, the contents of which are incorporated herein by reference in their entirety.

TECHNICAL FIELD

The present invention relates to a rotating electrical machine in which a rotor rotates when a current is supplied to an armature winding.

BACKGROUND ART

Conventionally, there is known a rotating electrical machine including a temperature detection device for detecting a temperature of an armature winding. In response to input of revolution speed information of a rotor, a protection temperature of the armature winding is calculated with the use of a map in which the protection temperature of the armature winding corresponding to the revolution speed of the rotor is set. The calculated protection temperature is compared to the temperature of the armature winding, thereby performing overheat protection of the armature winding (see, for example, Patent Literature 1).

CITATION LIST

Patent Literature

[PTL 1] JP 11-355959 A

SUMMARY OF INVENTION

Technical Problem

However, when the temperature of the armature winding transiently changes, such as at the time of start of the rotating electrical machine, a difference occurs between the temperature of the armature winding detected by the temperature detection device and an actual temperature of the armature winding. In order to perform the overheat protection of the armature winding in accordance with the transient change in temperature of the armature winding, a cooling device for cooling the armature winding needs to be provided. Thus, there has been a problem in that the scale of the rotating electrical machine increases.

The present invention provides a rotating electrical machine capable of downsizing.

Solution to Problem

According to the present invention, there is provided a rotating electrical machine, including: a stator including an armature winding; a rotor provided inside the stator in a rotatable manner; a power circuit unit including a power circuit semiconductor switching element, for supplying a current to the armature winding; and a control device in which an energization-allowed time corresponding to revolution speed of the rotor is set, for controlling supply of the current by the power circuit unit, in which the control device stops the supply of the current by the power circuit unit when an integrated time of energization times to the armature winding is longer than the energization-allowed time.

Advantageous Effects of Invention

According to the rotating electrical machine of the present invention, the energization-allowed time corresponding to the revolution speed of the rotor is set in the control device, and the control device stops the supply of current by the power circuit unit when the integrated time of the energization times to the armature winding is longer than the energization-allowed time. Thus, even when the temperature of the armature winding transiently changes, such as at the time of start of the rotating electrical machine, the overheat protection of the armature winding can be performed in accordance with the transient change in temperature of the armature winding. In this manner, there is no need to provide a cooling device for cooling the armature winding, thus downsizing the rotating electrical machine.

DESCRIPTION OF EMBODIMENTS

In the following, each of embodiments of the present invention is described based on the accompanying drawings. In each of the drawings, the same or equivalent members and parts are denoted by the same reference symbols for the description.

First Embodiment

Figure 1:
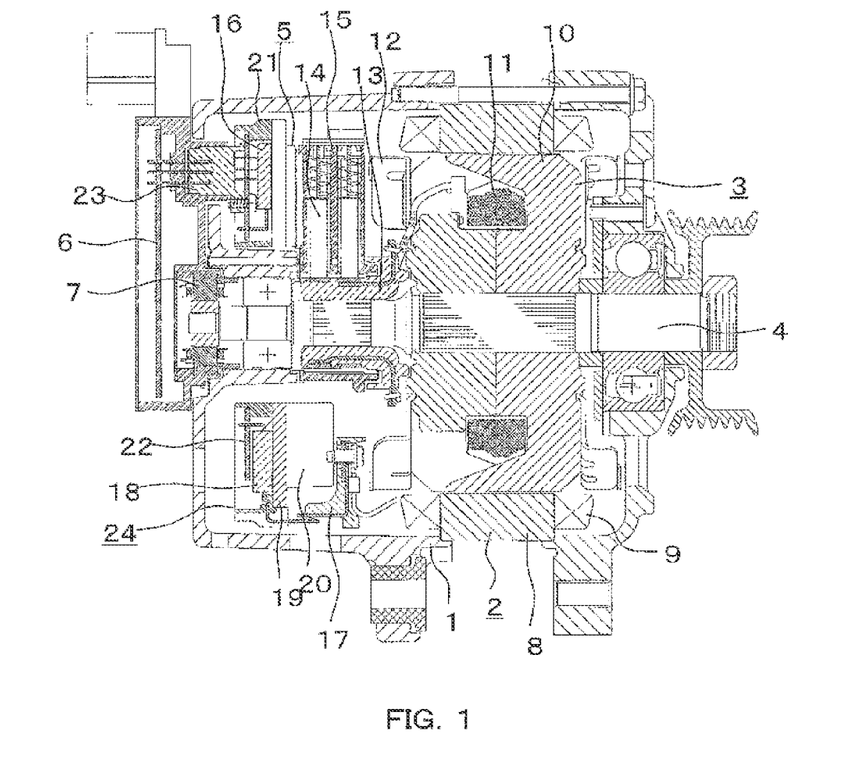
FIG. 1 A cross-sectional view illustrating a rotating electrical machine according to a first embodiment of the present invention.

FIG. 1 is a cross-sectional view illustrating a rotating electrical machine according to a first embodiment of the present invention. Referring to FIG. 1, the rotating electrical machine includes a bracket 1, a stator 2 housed in the bracket 1, a rotor 3 provided inside the stator 2 in a rotatable manner, a rotation shaft 4 that passes through the rotor 3 and is fixed to the rotor 3, a current supply device 5 for supplying a current to each of the stator 2 and the rotor 3, a control board (control device) 6 for controlling the supply of current by the current supply device 5, and a resolver 7 for detecting revolution speed (RPM) of the rotation shaft 4. The resolver 7 detects the revolution speed of the rotation shaft 4, thereby detecting revolution speed of the rotor 3.

The stator 2 includes a stator main body 8 and an armature winding 9 provided to the stator main body 8. The rotor 3 includes a rotor main body 10, a field winding 11 provided to the rotor main body 10 for generating magnetomotive force, a fan 12 that is formed into a ring shape and rotates together with the rotor main body 10, and a slip ring 13 that is disposed inside the fan 12 and rotates together with the rotor main body 10.

The current supply device 5 includes a brush 14 that is held in contact with the slip ring 13, a brush holder 15 for holding the brush 14, a field circuit unit 16 for supplying a current to the field winding 11 via the slip ring 13 and the brush 14, a wiring member 17 connected to the armature winding 9, and a power circuit unit 18 for supplying an AC current to the armature winding 9 via the wiring member 17.

The current supply device 5 further includes a heat sink 19 provided over the field circuit unit 16 and the power circuit unit 18, a cooling fin 20 provided to the heat sink 19, a case 21 in which terminals for power wirings and the like are inserted and in which the field circuit unit 16 and the power circuit unit 18 are housed, a relay board 22 electrically connected to each of the field circuit unit 16 and the power circuit unit 18, and a connector 23 provided to the relay board 22 for electrically connecting the control board 6 and the relay board 22 to each other.

The fan 12 is disposed so as to generate air toward the current supply device 5 when the fan 12 rotates.

The heat sink 19 is formed into a disc shape. A plurality of protrusions (not shown) are formed on one surface of the heat sink 19. The field circuit unit 16 and the power circuit unit 18 are firmly fixed to different protrusions of the heat sink 19 via an insulating adhesive. Therefore, the field circuit unit 16 and the power circuit unit 18 are disposed on the same surface of the heat sink 19. The case 21 is firmly fixed to the heat sink 19 via an adhesive. The case 21 is disposed on the same surface of the heat sink 19 as the surface on which the field circuit unit 16 and the power circuit unit 18 are disposed. The power wirings in the case 21 are connected to a power wiring terminal of the field circuit unit 16 and a power wiring terminal of the power circuit unit 18. The field circuit unit 16 and the power circuit unit 18 are housed in the case 21, and the relay board 22 and the connector 23 are electrically connected to the field circuit unit 16 and the power circuit unit 18. Then, the region inside the case 21 is sealed by a resin. In this manner, an electronic module 24 is formed.

The cooling fin 20 is provided on a surface of the heat sink 19 on the opposite side of the surface on which the field circuit unit 16 and the power circuit unit 18 are mounted. The cooling fin 20 is disposed so that the air generated by the rotation of the fan 12 may blow against the cooling fin 20.

The cooling fin 20 has a recess portion formed therein into which the brush holder 15 is interposed. The brush holder 15 interposed in the recess portion is electrically connected to the field circuit unit 16 via the terminal inserted in the case 21. Although the recess portion formed in the cooling fin 20 decreases cooling performance of the cooling fin 20, the decrease in cooling performance of the cooling fin 20 due to the recess portion is suppressed because of diffusion of heat to the whole heat sink 19.

The brush holder 15 and the wiring member 17 are disposed between the fan 12 and the heat sink 19. The brush holder 15 and the wiring member 17 form a cooling air path which is a path of the air generated by the rotation of the fan 12.

The electronic module 24 is housed in the bracket 1. The control board 6 and the resolver 7 are disposed outside the bracket 1.

The field circuit unit 16 includes a field semiconductor switching element for supplying a current to the field winding 11, an electronic component such as a capacitor electrically connected to the field semiconductor switching element, and a metal frame on which the field semiconductor switching element and the electronic component are mounted. The field circuit unit 16 is a molded module in which the field semiconductor switching element, the electronic component, and the metal frame are sealed by a resin by transfer molding so as to have a box shape. The metal frame is made of copper or a copper alloy having good thermal conductivity.

The power circuit unit 18 includes a power circuit semiconductor switching element for supplying a current to the armature winding 9, a temperature detection diode (first temperature detection device) for detecting a temperature of the power circuit semiconductor switching element, and a metal frame on which the power circuit semiconductor switching element and the temperature detection diode are mounted. The power circuit unit 18 is a molded module in which the power circuit semiconductor switching element, the temperature detection diode, and the metal frame are sealed by a resin by transfer molding so as to have a box shape. The metal frame is made of copper or a copper alloy having good thermal conductivity. The power circuit unit 18 is provided with upper and lower arms. The power circuit unit 18 is provided with a plurality of exposed connection terminals. The connection terminals include a connection terminal electrically connected to the temperature detection diode.

Figure 2:
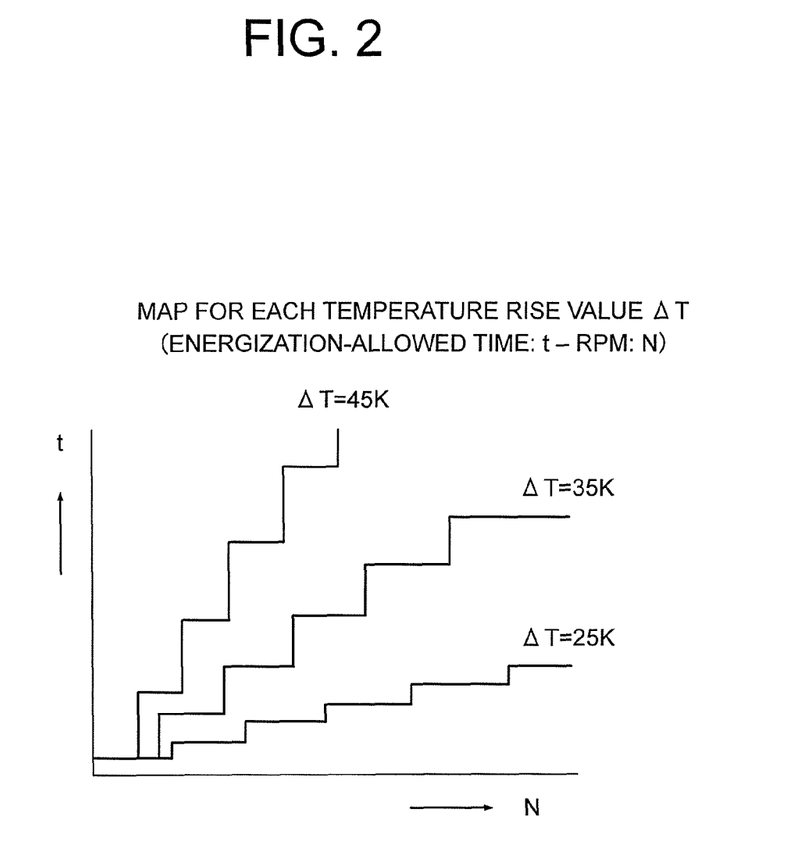
FIG. 2 A graph showing an energization-allowed time map of the rotating electrical machine of FIG. 1.

The control board 6 includes an energization-allowed time map in which an energization-allowed time corresponding to the revolution speed of the rotor 3 is set. As shown in FIG. 2, the energization-allowed time map has an energization-allowed time corresponding to each temperature rise value $\Delta T$ of the power circuit semiconductor switching element. The temperature rise value $\Delta T$ of the power circuit semiconductor switching element is calculated from a difference between an actual temperature of the power circuit semiconductor switching element and a limit temperature of the power circuit semiconductor switching element. The energization-allowed time is weighted in accordance with the revolution speed of the rotor 3. In other words, in the energization-allowed time map, the energization-allowed time becomes longer as the revolution speed of the rotor 3 becomes larger.

The rotating electrical machine has operating modes such as restart for restarting an engine, assist for increasing power for a vehicle, power generation, power regeneration, and stop of idling. In any of the operating modes, overheat protection needs to be performed in order to prevent generation of abnormal overheat in the power circuit semiconductor switching element of the power circuit unit 18.

In the power circuit semiconductor switching element, the temperature rises greatly in particular at the time of restart where an operating time is short but a flowing current is large and the amount of generated heat is large or at the time of driving such as assist. Therefore, depending on the temperature of the power circuit semiconductor switching element before operation, it is necessary to set such an energization time that the temperature of the power circuit semiconductor switching element may not exceed an element limit temperature thereof in the case of stopping idling (and restarting) or the case of not performing the driving operation and to set such an energization time that the temperature of the power circuit semiconductor switching element may not exceed the element limit temperature thereof even in the case of performing the driving operation. Note that, in the case of stopping idling, the power circuit semiconductor switching element itself does not generate heat, but it is necessary to consider the case where the temperature of the power circuit semiconductor switching element may rise due to, for example, heat received from parts other than the power circuit semiconductor switching element, such as the stator 2, via the heat sink 19.

Figure 3:
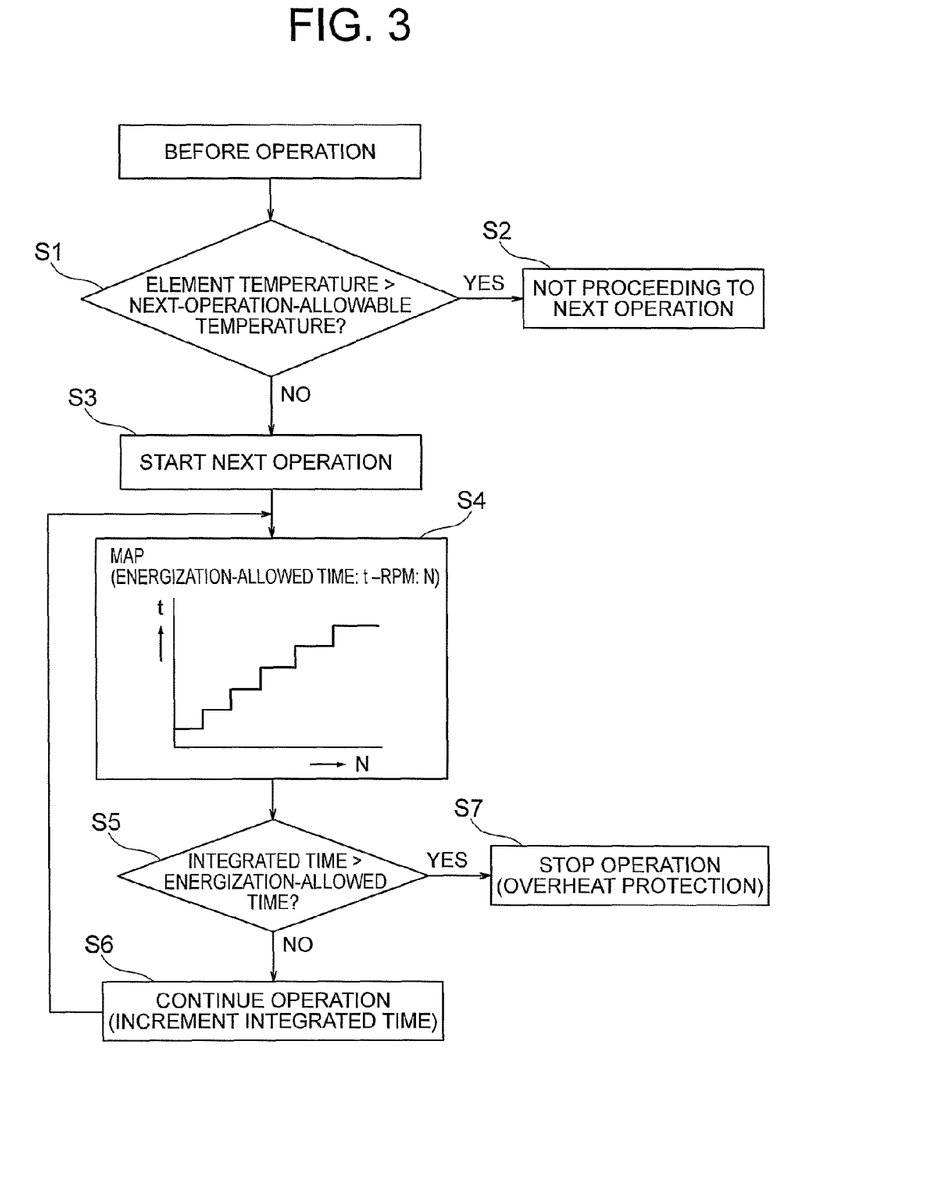
FIG. 3 A flowchart illustrating control on the supply of current to a power circuit unit performed by a control board of FIG. 1.

Next, description is given of overheat protection operation of the rotating electrical machine. FIG. 3 is a flowchart illustrating control on the supply of current to the power circuit unit 18 performed by the control board 6 of FIG. 1. Before operation, namely before power generation of the rotating electrical machine, the control board 6 compares a temperature of the power circuit semiconductor switching element to a next-operation-allowable temperature which is a temperature necessary for supplying a current to the power circuit semiconductor switching element (Step S1). The temperature of the power circuit semiconductor switching element is detected by the temperature measurement diode. The next-operation-allowable temperature is determined in consideration of a temperature increment necessary for an operation immediately after this state, for example, a temperature increment necessary in the case of stopping idling and performing restarting or in the case of performing the driving or the like. By comparing the temperature of the power circuit semiconductor switching element to the next-operation-allowable temperature, the rotating electrical machine is prevented from immediately starting the overheat protection. Otherwise, for example, assist can be performed only in a very short period of time depending on the temperature of the power circuit semiconductor switching element.

When the control board 6 determines in Step S1 that the temperature of the power circuit semiconductor switching element is higher than the next-operation-allowable temperature, the process does not proceed to the next operation (Step S2). Then, the overheat protection of the rotating electrical machine starts.

On the other hand, when the control board 6 determines in Step S1 that the temperature of the power circuit semiconductor switching element is lower than the next-operation-allowable temperature, the control board 6 starts the supply of current from the power circuit semiconductor switching element to the armature winding 9. Then, the next operation of the rotating electrical machine starts (Step S3).

The control board 6 uses the temperature of the power circuit semiconductor switching element and the revolution speed of the rotor 3 detected by the resolver 7 to determine an energization-allowed time by referring to the energization-allowed time map, and counts an integrated time from the start of operation (Step S4).

After that, the control board 6 compares the integrated time to the energization-allowed time (Step S5). When the control board 6 determines in Step S5 that the integrated time is shorter than the energization-allowed time, the operation of the rotating electrical machine is continued (Step S6). In the case where the integrated time is shorter than the energization-allowed time, when the revolution speed of the rotor 3 has changed during the operation, the control board 6 refers to the energization-allowed time map and changes the energization-allowed time to an energization-allowed time corresponding to the current revolution speed of the rotor 3.

When the control board 6 determines in Step S5 that the integrated time is longer than the energization-allowed time, the overheat protection of the rotating electrical machine occurs to stop the operation of the rotating electrical machine (Step S7).

As described above, according to the rotating electrical machine in the first embodiment of the present invention, the energization-allowed time corresponding to the revolution speed of the rotor 3 is set in the control board 6, and the control board 6 stops the supply of current by the power circuit unit 18 when the integration time of the energization time to the armature winding 9 is longer than the energization-allowed time. Thus, even when the temperature of the armature winding 9 transiently changes, such as at the time of start of the rotating electrical machine, the overheat protection of the armature winding 9 can be performed in accordance with the transient change in temperature of the armature winding 9. In this manner, there is no need to provide a cooling device for cooling the armature winding 9, thus downsizing the rotating electrical machine.

Further, the rotating electrical machine includes the temperature detection diode for detecting the temperature of the power circuit semiconductor switching element, and the control board 6 controls the supply of current by the power circuit unit 18 in accordance with the temperature of the power circuit semiconductor switching element. Thus, whether or not to perform the next operation can be determined based on the temperature of the power circuit semiconductor switching element immediately before the start of driving. In this manner, the power circuit semiconductor switching element can be reliably protected.

Further, the energization-allowed time corresponding to the temperature of the power circuit semiconductor switching element is set in the control board 6, and hence the energization-allowed time can be set to be longer.

Further, the energization-allowed time is weighted in accordance with the revolution speed of the rotor 3, and hence the energization-allowed time can be set to be longer.

The field circuit unit 16 and the power circuit unit 18 are disposed on the same surface of the heat sink 19, and the relay board 22 is electrically connected to the field circuit unit 16 and the power circuit unit 18. Thus, even in the case where the positions of the connection terminals for the field circuit unit 16 and the power circuit unit 18 are apart from one another in the electronic module 24, each of the field circuit unit 16 and the power circuit unit 18 can be electrically connected to the control board 6 with ease.

The heat sink 19 is formed into a disc shape, the field circuit unit 16 and the power circuit unit 18 are disposed on the same surface of the heat sink 19, and the cooling fin 20 is disposed on the surface of the heat sink 19 on the opposite side of the surface on which the field circuit unit 16 and the power circuit unit 18 are mounted. Thus, the arrangement space in the bracket 1 can be used effectively, and the size of the heat sink 19 can be increased. Therefore, the installation space for the field circuit unit 16 and the power circuit unit 18 and the area of the cooling fin 20 can be ensured with ease.

The armature winding 9 and the power circuit unit 18 are electrically connected to each other via the wiring member 17. Thus, even when the position of the stator 2 and the wiring mount position of the electronic module 24 are greatly apart from each other, the armature winding 9 and the power circuit unit 18 can be electrically connected to each other with ease. In this manner, the degree of freedom on the arrangement positions of the armature winding 9 and the power circuit unit 18 can be improved.

Second Embodiment

Figure 4:
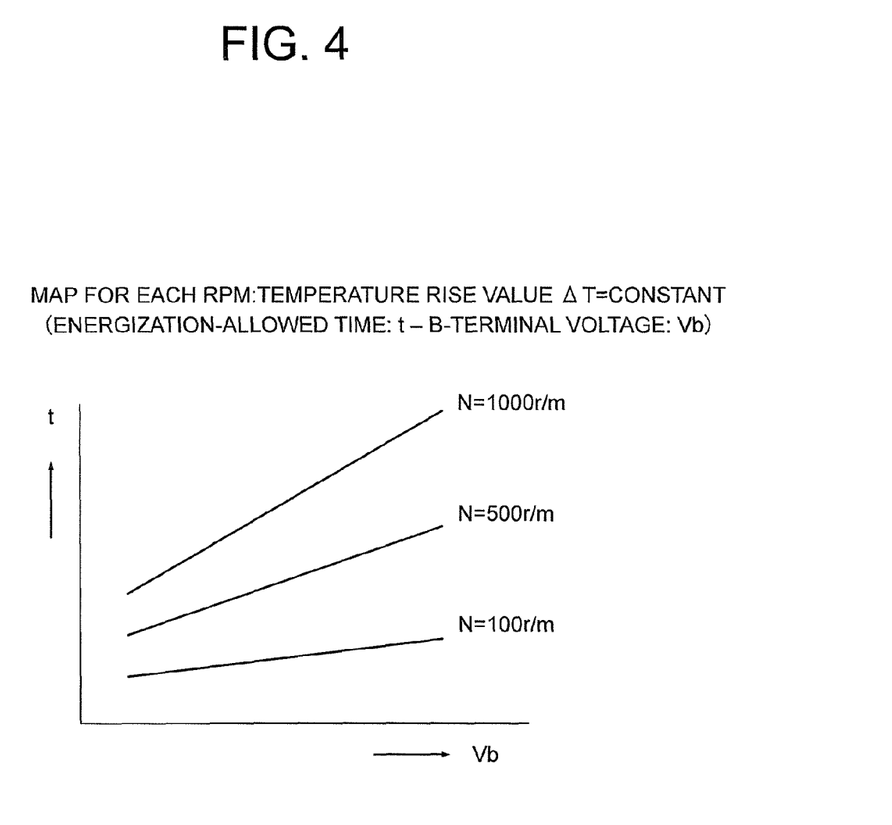
FIG. 4 A graph showing an energization-allowed time map of a rotating electrical machine according to a second embodiment of the present invention.

FIG. 4 is a graph showing an energization-allowed time map of a rotating electrical machine according to a second embodiment of the present invention. In the first embodiment, the energization-allowed time after the start of operation is determined based on the temperature of the power circuit semiconductor switching element before the operation. In the second embodiment, however, the control board 6 further includes an energization-allowed time map in which an energization-allowed time corresponding to a B-terminal voltage is set. In this additional energization-allowed time map, the energization-allowed time corresponding to the B-terminal voltage and the revolution speed of the rotor 3 is set for each temperature rise value ΔT of the power circuit semiconductor switching element.

Even when the revolution speed of the rotor 3 does not change, the current supplied to the power circuit semiconductor switching element changes in accordance with the B-terminal voltage applied to the power circuit semiconductor switching element. Thus, the amount of generated heat in the power circuit semiconductor switching element changes with the change in B-terminal voltage, and hence a temperature change amount of the power circuit semiconductor switching element changes.

As described above, according to the rotating electrical machine in the second embodiment of the present invention, the energization-allowed time corresponding to the B-terminal voltage is set in the control board 6. Thus, the energization-allowed time can be set in accordance with the temperature change amount of the power circuit semiconductor switching element generated by the change in B-terminal voltage. In this manner, the conditions for overheat protection can be subdivided to improve the accuracy of temperature estimation so that the number of the operable conditions of the rotating electrical machine may be increased. Therefore, excessive cooling performance becomes unnecessary, thus realizing a compact and light rotating electrical machine.

Further, in the control board 6, the energization-allowed time corresponding to the temperature of the power circuit semiconductor switching element before the start of supply of current by the power circuit unit 18 and the energization-allowed time corresponding to the B-terminal voltage are set. Thus, whether or not to perform the next operation can be determined based on the temperature of the power circuit semiconductor switching element immediately before driving and based on the B-terminal voltage. In this manner, the power circuit semiconductor switching element can be reliably protected.

Third Embodiment

Figure 5:
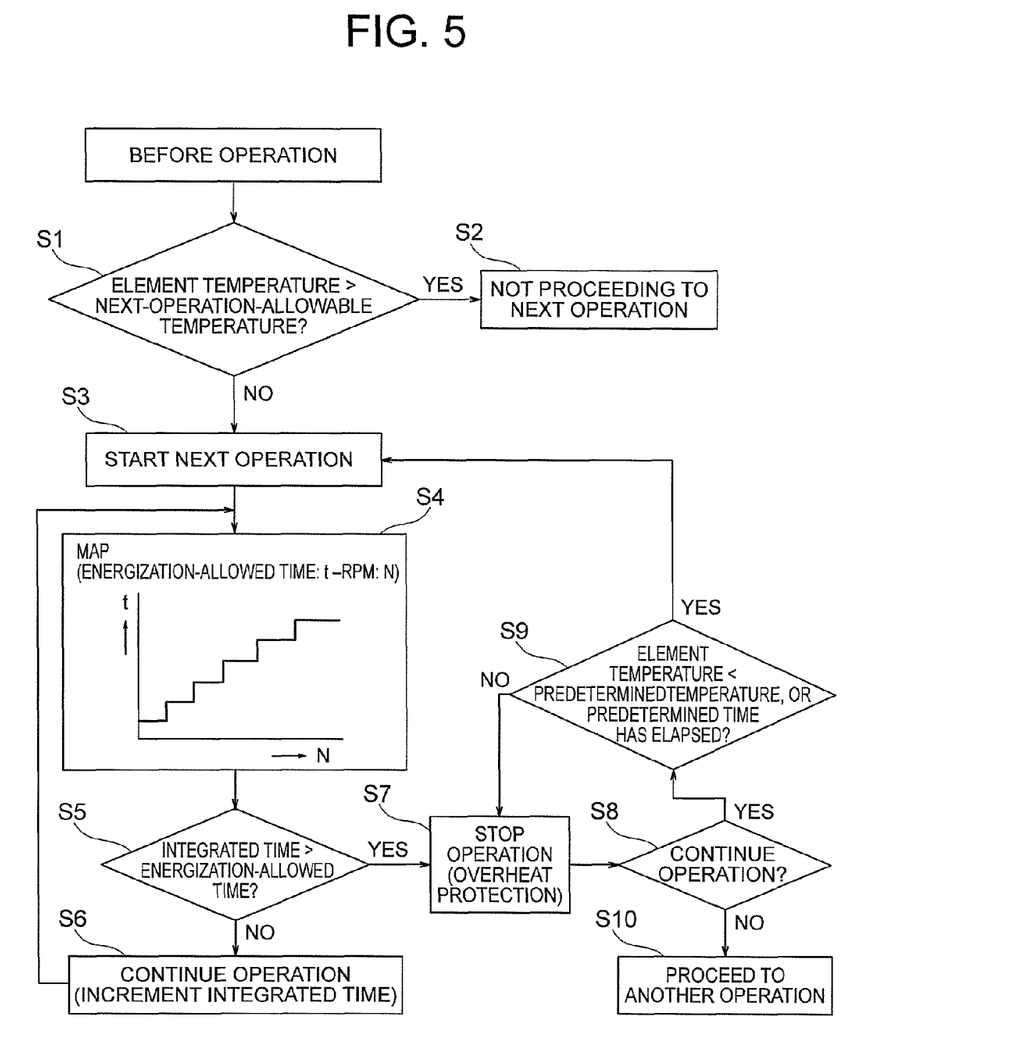
FIG. 5 A flowchart illustrating control on the supply of current to a power circuit unit performed by a control board of a rotating electrical machine according to a third embodiment of the present invention.

FIG. 5 is a flowchart illustrating control on the supply of current to a power circuit unit 18 performed by a control board 6 of a rotating electrical machine according to a third embodiment of the present invention. In the third embodiment, after the operation of the rotating electrical machine is stopped by overheat protection of the rotating electrical machine (Step S7), when the operation is restarted (the operation is continued) (Step S8), the control board 6 determines whether or not the temperature of the power circuit semiconductor switching element has become lower than a predetermined temperature or determines whether or not a predetermined time period has elapsed since the stop of the supply of current by the power circuit unit 18 (Step S9).

When the control board 6 determines in Step S9 that the temperature of the power circuit semiconductor switching element has become lower than the predetermined temperature or that the predetermined time period has elapsed since the stop of the supply of current by the power circuit unit 18, the next operation of the rotating electrical machine starts (Step S3).

On the other hand, when the control board 6 determines in Step S9 that the temperature of the power circuit semiconductor switching element is not lower than the predetermined temperature or that the predetermined time period has not elapsed since the stop of the supply of current by the power circuit unit 18, the supply of current by the power circuit unit 18 remains stopped (Step S7).

On the other hand, in the case where the operation is not restarted (the operation is not continued) in Step S8, the process proceeds to another operation (Step S10).

As described above, according to the rotating electrical machine in the third embodiment of the present invention, after the supply of current by the power circuit unit 18 is stopped in response to the fact that the integrated time of the energization times has become longer than the energization-allowed time, the control board 6 continues stopping the supply of current by the power circuit unit 18 until the temperature of the power circuit semiconductor switching element becomes lower than a predetermined temperature or until a predetermined time period has elapsed since the stop of the supply of current by the power circuit unit 18. Thus, it is possible to prevent the stop of the operation in response to the fact that the integrated time has exceeded the energization-allowed time immediately after the restart operation.

Fourth Embodiment

A rotating electrical machine according to a fourth embodiment of the present invention further includes a thermistor (second temperature detection device) for detecting a temperature of the heat sink 19. The control board 6 further includes an energization-allowed time map corresponding to the temperature of the heat sink 19. In this manner, the next-operation-allowable temperature and the energization-allowed time can be subdivided, thus improving the accuracy of temperature estimation of the power circuit semiconductor switching element.

During the operation, the heat sink 19 is cooled by cooling air because of the rotation of the rotor 3. Therefore, the temperature of the heat sink 19 becomes lower than the temperature of the power circuit semiconductor switching element. In the state where the idling is stopped, however, the temperature of the heat sink 19 increases after the stop of operation because of heat received from the stator 2, for example. The temperature of the power circuit semiconductor switching element, on the other hand, decreases in response to the stop of operation. As a result, a temperature difference between the power circuit semiconductor switching element and the heat sink 19 is eliminated with the lapse of time from the stop of operation, and in some cases, the temperature of the heat sink 19 may become higher than the temperature of the power circuit semiconductor switching element.

In the case where the temperature of the heat sink 19 is higher than the temperature of the power circuit semiconductor switching element, the effect of cooling the power circuit semiconductor switching element by the heat sink 19 is reduced, and hence the energization-allowed time needs to be shortened. To deal with this, in the fourth embodiment, the temperature of the heat sink 19 and the temperature of the power circuit semiconductor switching element before the start of operation are compared to each other. Then, when the temperature of the heat sink 19 is lower than the temperature of the power circuit semiconductor switching element, the temperature of the power circuit semiconductor switching element is used to determine the energization-allowed time similarly to the first embodiment. When the temperature of the heat sink 19 is higher than the temperature of the power circuit semiconductor switching element, the temperature of the heat sink 19 is used to determine the energization-allowed time.

As described above, the rotating electrical machine in the fourth embodiment of the present invention includes the thermistor for detecting the temperature of the heat sink 19, and the control board 6 controls the supply of current by the power circuit unit 18 in correspondence with the temperature of the heat sink 19. Thus, even when the temperature of the heat sink 19 is higher than the temperature of the power circuit semiconductor switching element, the overheat protection of the power circuit semiconductor switching element can be reliably performed.

While the thermistor for detecting the temperature of the heat sink 19 has been exemplified as the second temperature detection device in the above-mentioned fourth embodiment, the second temperature detection device may be any temperature detection device for detecting a temperature inside the bracket 1 instead of the temperature of the heat sink 19.

REFERENCE SIGNS LIST

1 bracket, 2 stator, 3 rotor, 4 rotation shaft, 5 current supply device, 6 control board (control device), 7 resolver, 8 stator main body, 9 armature winding, 10 rotor main body, 11 field winding, 12 fan, 13 slip ring, 14 brush, 15 brush holder, 16 field circuit unit, 17 wiring member, 18 power circuit unit, 19 heat sink, 20 cooling fin, 21 case, 22 relay board, 23 connector, 24 electronic module.

The invention claimed is:

1. A rotating electrical machine, comprising:
    a stator including an armature winding;
    a rotor provided inside the stator in a rotatable manner;
    a power circuit for supplying a current to the armature winding; and
    a control device in which an energization-allowed time corresponding to revolution speed of the rotor is set, for controlling supply of the current by the power circuit, wherein the energization-allowed time is weighted in accordance with the revolution speed of the rotor, the control device stops the supply of the current by the power circuit when an integrated time of energization times from the start of the energization is longer than the energization-allowed time, and the supply of current from the power circuit semiconductor switching element to the armature winding starts at the start of the energization.

2. A rotating electrical machine according to claim 1, wherein the power circuit is configured to detect a temperature within the power circuit,
    wherein the control device controls the supply of the current by the power circuit in accordance with the temperature detected within the power circuit.

3. A rotating electrical machine according to claim 2, wherein the energization-allowed time corresponding to the temperature of the power circuit is set in the control device.

4. A rotating electrical machine according to claim 2, wherein, after the control device stops the supply of the current by the power circuit in response to a fact that the integrated time of the energization times has become longer than the energization-allowed time, the control device continues stopping the supply of the current by the power circuit unit until the temperature of the power circuit becomes lower than a predetermined temperature or until a predetermined time period has elapsed since the stop of the supply of the current by the power circuit.

5. A rotating electrical machine according to claim 1, wherein the energization-allowed time corresponding to a Battery-terminal voltage is set in the control device.

6. A rotating electrical machine according to claim 2, wherein the energization-allowed time corresponding to a temperature of the power circuit before start of the supply of the current by the power circuit and the energization-allowed time corresponding to a Battery-terminal voltage are set in the control device.

7. A rotating electrical machine according to claim 1, further comprising:
    a heat sink provided to the power circuit,
    wherein the control device controls the supply of the current by the power circuit in accordance with a detected temperature of the heat sink.

* * * * *